(12) United States Patent
Welp et al.

(10) Patent No.: US 10,956,127 B2
(45) Date of Patent: Mar. 23, 2021

(54) ENRICHED INTEGRATED DEVELOPMENT ENVIRONMENTS

(71) Applicant: International Business Machines Corporation, Armonk, NY (US)

(72) Inventors: Richard Welp, Manchester (GB); Dionysios Kalofonos, Salford (GB); Patrick J. Byrne, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/361,081

(22) Filed: Mar. 21, 2019

(65) Prior Publication Data
US 2020/0301673 A1 Sep. 24, 2020

(51) Int. Cl.
| | | |
|---|---|---|
| *G06F 9/44* | (2018.01) | |
| *G06F 8/10* | (2018.01) | |
| *G06F 8/33* | (2018.01) | |
| *G06K 9/62* | (2006.01) | |
| *G06F 16/901* | (2019.01) | |
| *G06N 5/02* | (2006.01) | |

(Continued)

(52) U.S. Cl.
CPC .......... *G06F 8/10* (2013.01); *G06F 8/33* (2013.01); *G06F 16/9024* (2019.01); *G06F 40/169* (2020.01); *G06K 9/6267* (2013.01); *G06N 5/02* (2013.01); *G06F 8/72* (2013.01)

(58) Field of Classification Search
CPC ..... G06F 8/73; G06F 8/71; G06F 8/75; G06F 8/20; G06F 8/10; G06F 16/9024; G06F 40/169; G06F 8/33; G06F 8/72; G06K 9/6267; G06N 5/02

USPC ......................................................... 717/123
See application file for complete search history.

(56) References Cited

U.S. PATENT DOCUMENTS

| | | |
|---|---|---|
| 7,277,904 B2 | 10/2007 | Baird |
| 7,761,851 B2 | 7/2010 | Bailey et al. |
| 8,607,190 B2 | 12/2013 | Coldicott et al. |

(Continued)

OTHER PUBLICATIONS

Medeiros et al., "Artificial intelligence and intellectual property considerations," Financier Worldwide Magazine, Jan. 2018, 4 pages, retrieved from https://www.financierworldwide.com/artificial-intelligence-and-intellectual-property-considerations/#.XFMgDIVKiUk.

(Continued)

*Primary Examiner* — Chuck O Kendall
(74) *Attorney, Agent, or Firm* — Zilka-Kotab, P.C.

(57) ABSTRACT

A computer-implemented method includes accessing documentation and classifying the documentation. The method includes associating the documentation with symbols in a source code index of an integrated development environment. The symbols are of a code base. The method also includes creating annotations to the code base linking the documentation to the symbols associated therewith. A computer program product for an enriched integrated development environment includes a computer readable storage medium having program instructions embodied therewith. The program instructions are executable by a computer. The program instructions cause the computer to perform the foregoing method. A system includes a processor and logic integrated with the processor, executable by the processor, or integrated with and executable by the processor. The logic is configured to perform the foregoing method.

20 Claims, 4 Drawing Sheets

(51) Int. Cl.
    *G06F 40/169*    (2020.01)
    *G06F 8/72*    (2018.01)

(56) References Cited

U.S. PATENT DOCUMENTS

| | | | |
|---|---|---|---|
| 8,667,456 B1* | 3/2014 | Czymontek | G06F 8/315 |
| | | | 717/100 |
| 9,817,655 B1 | 11/2017 | Mandrika et al. | |
| 2014/0013304 A1* | 1/2014 | Vangala | G06F 8/75 |
| | | | 717/123 |
| 2015/0186507 A1 | 7/2015 | Pawar et al. | |
| 2015/0379439 A1 | 12/2015 | Klein et al. | |
| 2018/0239771 A1 | 8/2018 | Diaz De Arcaya et al. | |
| 2018/0239809 A1 | 8/2018 | Diaz De Arcaya et al. | |

OTHER PUBLICATIONS

Cabot, J., "I tested all intelligent IDEs (and ended up disappointed)," Livable Software, Dec. 12, 2017, pp. 1-9, retrieved from https://livablesoftware.com/smart-intelligent-ide-programming/.

Wikipedia, "Agile software development," Wikipedia, 2019, 21 pages, retrieved from https://en.wikipedia.org/wiki/Agile_software_development.

Bruch et al., "IDE 2.0: Collective Intelligence in Software Development," Proceedings of the 2010 FSE/SDP Workshop on the Future of Software Engineering Research, 2010, 6 pages, retrieved from https://hal.archives-ouvertes.fr/hal-01575346/document.

Linchpinseo, "A Beginners Guide to Understanding the Agile Method," Linchpin SEO, 2019, pp. 1-5, retrieved from https://linchpinseo.com/the-agile-method/.

* cited by examiner

ENRICHED INTEGRATED DEVELOPMENT ENVIRONMENTS

BACKGROUND

The present invention relates to integrated development environments and artificial intelligence, and more specifically, this invention relates to content management in integrated development environments.

An organization may generate documentation corresponding to various projects including source code, design documents, conversations, user documentation, emails, patents, etc. Project documentation may also span various forms of media including source code repositories, design documents written in wiki and/or word documents, user documents written in Hypertext Markup Language (HTML) stored on servers, audio and/or visual recordings of notes, etc. Maintaining consistency throughout documentation relating to a project is important for efficient development and/or implementation of the project.

SUMMARY

A computer-implemented method, according to one embodiment, includes accessing documentation and classifying the documentation. The method includes associating the documentation with symbols in a source code index of an integrated development environment. The symbols are of a code base. The method also includes creating annotations to the code base linking the documentation to the symbols associated therewith.

A computer program product for an enriched integrated development environment, according to one embodiment, includes a computer readable storage medium having program instructions embodied therewith. The program instructions are executable by a computer. The program instructions cause the computer to perform the foregoing method.

A system, according to one embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for enriched integrated development environments.

In one general embodiment, a computer-implemented method includes accessing documentation and classifying the documentation. The method includes associating the documentation with symbols in a source code index of an integrated development environment. The symbols are of a code base. The method also includes creating annotations to the code base linking the documentation to the symbols associated therewith.

In another general embodiment, a computer program product for an enriched integrated development environment includes a computer readable storage medium having program instructions embodied therewith. The program instructions are executable by a computer. The program instructions cause the computer to perform the foregoing method.

In another general embodiment, a system includes a processor and logic integrated with the processor, executable by the processor, or integrated with and executable by the processor. The logic is configured to perform the foregoing method.

Figure 1:
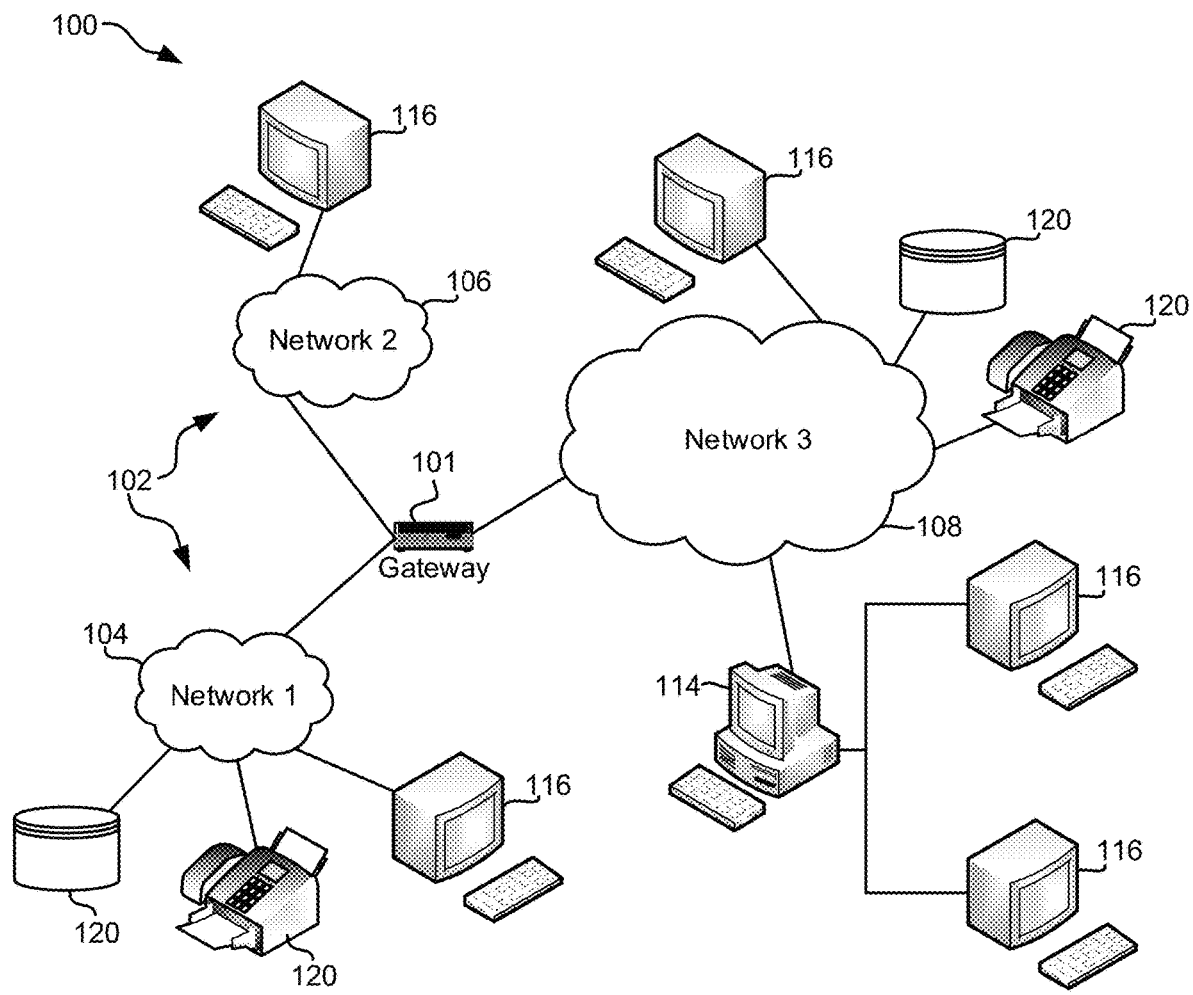
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
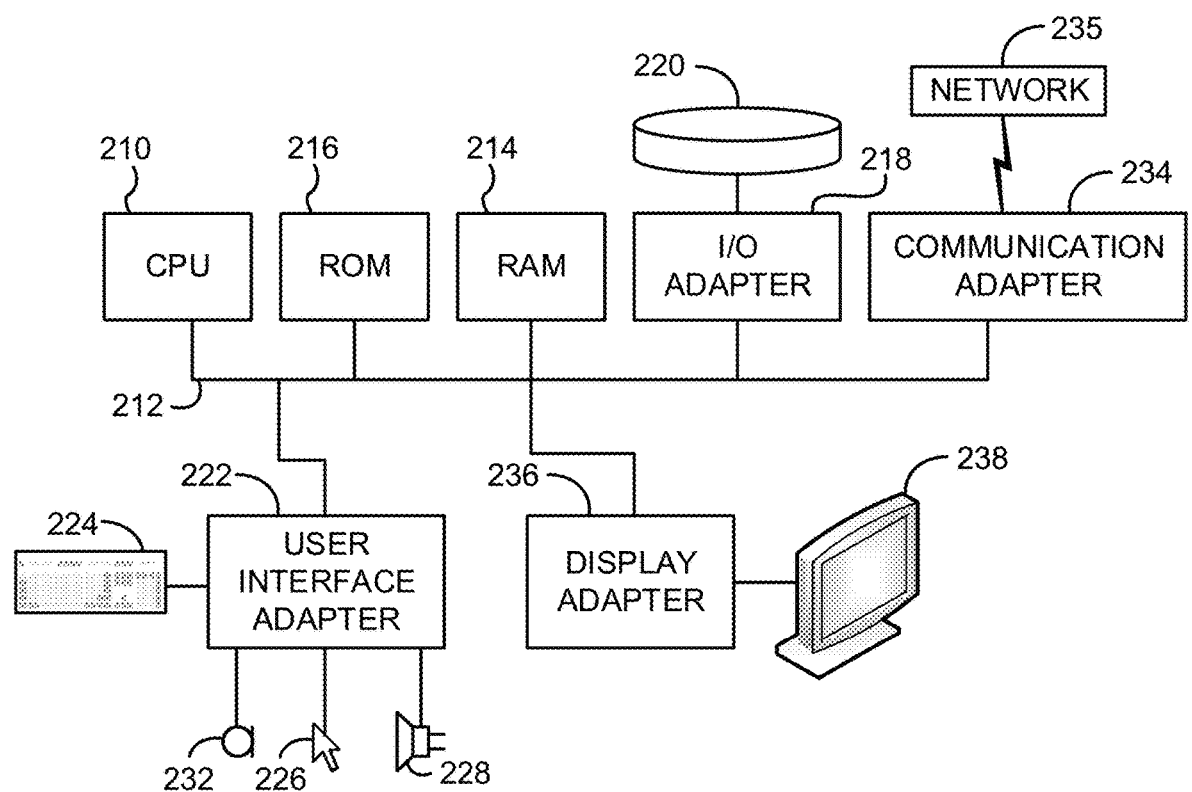
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

An organization may generate documentation corresponding to intellectual property project development in a variety of types including source code, design documents, conversations, user documentation, patents, etc. Intellectual property development may span various forms of media including source code repositories, design documents written in wiki and/or word documents, user documents written in Hypertext Markup Language (HTML) stored on servers, audio and/or visual recordings of notes, etc.

Managing various forms of documentation and/or media may be complex, especially if the forms are independent of each other. Conventionally, various forms of documentation should be maintained in parallel. Changes made to one form should be subsequently reflected in any other forms. Modifications to source code should also be reflected in the user documentation for reference, and developments in the user documentation should be accurately integrated into the source code.

Integrated development environment (IDE) applications for software development may be capable of analyzing a code base. IDEs may be used for classifying class hierarchies, object relations, call hierarchies, type hierarchies, etc. IDEs are conventionally limited to analyzing the code base in order to perform the foregoing functions. A developer using a conventional IDE must still resort to consulting design documentation and manually identifying relevant portions for implementation into the code base. Consulting design documentation and identifying relevant portions thereof for the code base is a complex, expensive, and/or time consuming process.

IDEs typically maintain a source code index for symbols in the code base and associated information such as the locations where a symbol is used (e.g., a file and line), the places where the symbol is defined (e.g., variable declarations, function declarations, macro definitions, etc.), call hierarchies (e.g., for each function the index contains the callers of the functions), etc.

Inconsistencies may be introduced when various forms of the intellectual property documentation are modified asynchronously. IDEs may refactor the code base. Any refactoring changes are limited to the code base and do not affect any external documentation. For example, when a variable is renamed, refactoring the code base may reflect the new name in all the instances in the code base. However, refactoring the code base may not affect any external documentation, including any design documents.

Agile methodologies recognize the need to share information within a team. Agile methodologies emphasize the code base as the documentation. Relying on the code base as forming the documentation results in "agile" teams relying on test-driven development (TDD). TDD encourages developers to capture any requirements, behaviors of the system, and/or the scope of changes through unit tests. A need remains for implementing and/or maintaining the unit tests similar to the need to implement and/or maintain the code base in more traditional software development approaches.

Various inventive embodiments disclosed herein include an enriched IDE for integrating multiple forms of intellectual property development documentation around the code base corresponding to an intellectual property project.

Figure 3:
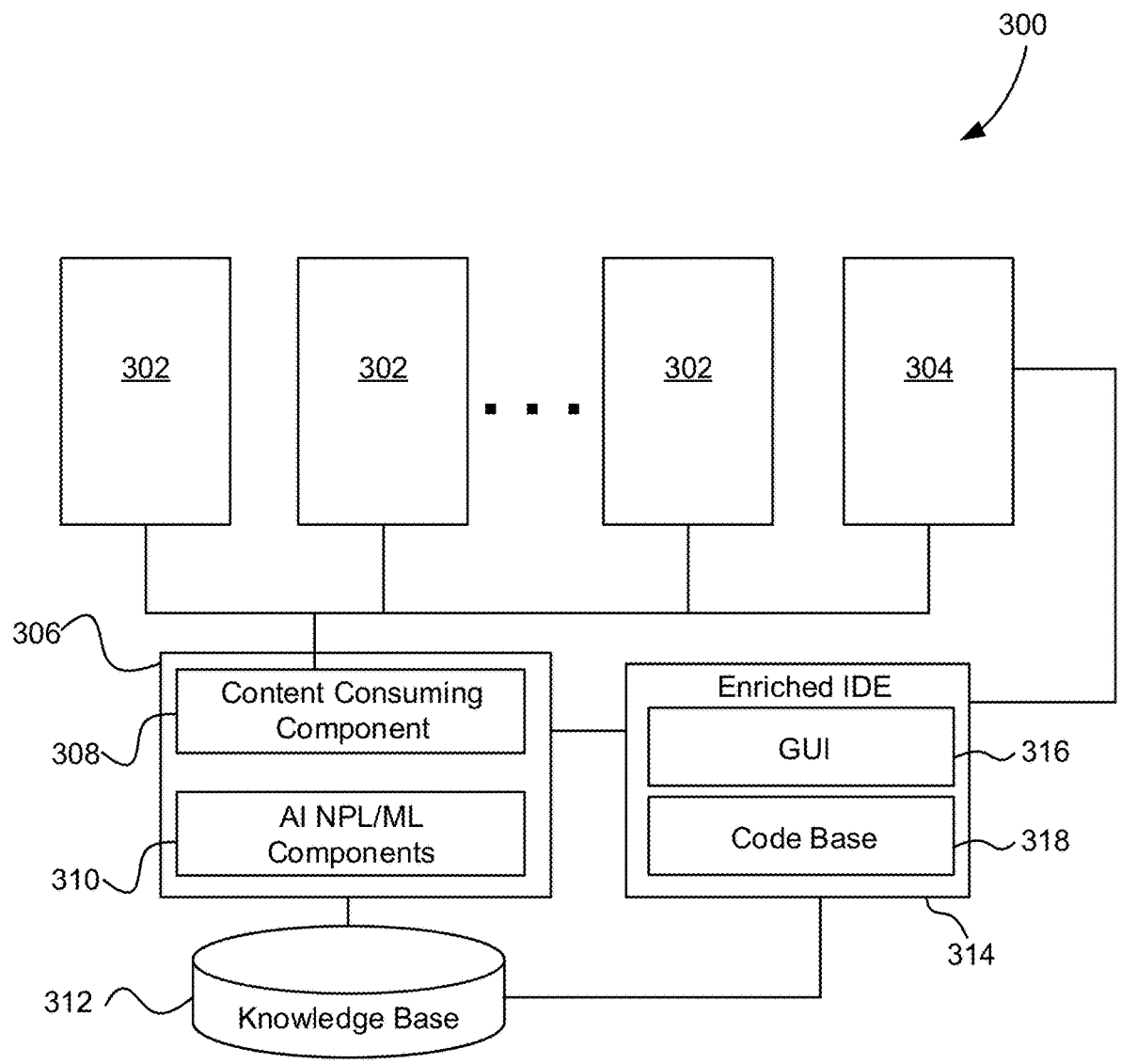
FIG. 3 is a schematic diagram of a system in which various inventive embodiments may operate, in accordance with one embodiment.

FIG. 3 is a block diagram of an exemplary system 300 in which various disclosed inventive embodiments may operate. As an option, the present system 300 may be implemented in conjunction with features from any other embodiment listed herein, such as those described with reference to the other FIGS. Of course, however, such system 300 and others presented herein may be used in various applications and/or in permutations which may or may not be specifically described in the illustrative embodiments listed herein. Further, the system 300 presented herein may be used in any desired environment.

Multiple forms of documentation 302 may be provided as a corpus and/or group of documentation as defined by the user. The documentation 302 may comprise source code, a code base, design documents, design specifications, emails, user documentation, patents, audiovisual recordings, wikis, word documents, PowerPoint presentations, printable document format (PDF), or any form of documentation known in the art. In some approaches, the documentation 302 may relate to software development. In a preferred approach, at least some of the documentation 302 comprises source code.

In one approach, the documentation 302 may comprise all of the same type. For example, all of the documentation 302 provided may be emails corresponding to a particular IP project. In another approach, the documentation 302 may comprise different types including any of the forms listed above.

In one approach, the documentation 302 may comprise non-text based documents including audio, video, image, sources, etc. In some approaches, the non-text based documentation may be preprocessed to extract content for natural language processing via any audio to text processing and/or image analysis technique known in the art.

A source code index 304 may be provided. The source code index 304 may be generated using any technique known in the art using any available program for generating source code and/or a source code index, as would be understood by one having ordinary skill in the art upon reading the present description. In some approaches, the symbols in the source code index are part of a code base.

The various forms of documentation 302 and the source code index 304 may be consumed by the Artificial Intelligence (AI) Natural Language Parser (NLP)/Machine-Learning (ML) system 306 for processing.

Any combination of AI, NLP, and/or ML techniques may be used by an AI NLP/ML system 306 for processing the content of the documentation. In a preferred approach, Watson Natural Language Understanding (International Business Machines (IBM) Corporation, 1 New Orchard Road Armonk, N.Y. 10504-1722, United States) may be used.

The documentation 302 and the source code index 304 are analyzed by the AI NLP/ML system 306 to classify the documentation 302 associated with symbols of the source code index 304.

The AI NLP/ML system 306 may comprise a content consuming component 308 for inputting the documentation 302 and/or the source code index 304. The content consuming component 308 may preprocess and/or process the content of the documentation 302 and/or the source code index 304.

AI NLP/ML components 310 of the AI NLP/ML system 306 may classify the documentation 302 according to type, form, association with symbols in the source code, concepts, project, team, inventors, etc.

AI NLP/ML components 310 of the AI NLP/ML system 306 may create cognitive associations between the documentation 302 and the source code index 304, especially symbols of the source code index. Symbols within the content of the documentation 302 and the source code index 304 may be extracted using the AI NLP/ML components 310. The AI NLP/ML components 310 may comprise any known technique to extract symbols within the documentation 302 and the source code index 304. The symbols and/or associations may be cognitively derived by the AI NLP/ML components 310 of the AI NLP/ML system 306.

Any symbols, learned concepts, associations, links, classifications, mappings, documentation, source code, class hierarchy graph, code base, etc. may be stored in a knowledge base 312. The knowledge base 312 may be a database and/or any data storage method of consumed content with classifications of documentation 302 and associations between the documentation and symbols in the source code 304 known in the art. In one approach, the knowledge base 312 maintains the original documentation 312, source code 304, etc. The knowledge base 312 may comprise a logical understanding of how the original documentation 312, source code index 304, etc. are associated using AI techniques.

In one approach, the knowledge base 312 may function as a search engine for the AI NLP/ML system 306 in order to search classifications, associations, and/or symbols in documentation, the source code, etc.

The system 300 may comprise an enriched IDE 314 as discussed in further detail below with reference to FIG. 4. Any output of the AI NLP/ML system 306 and/or the knowledge base 312 may be input into the enriched IDE 314. The enriched IDE 314 may be an integration of AI NLP/ML capabilities and source code analysis. The enriched IDE 314 may provide easy access to relevant portions of documentation corresponding to symbols in a source code and/or a source code index. For example, a developer may have access to the code base, comments captured therein, supportive information within the design documentation, etc.

The enriched IDE 314 may comprise a graphical user interface (GUI) 316 for facilitating interaction between the user and the code base with the integrated documentation associations, classifications, annotations, twisties, hoverovers, links, relevant portions, etc.

The enriched IDE 314 may comprise a code base 318. The code base 318 may be the code base corresponding to the source code index 304. In some approaches, the code base 318 may appear as an index in the GUI 316 for indexing the source code corresponding to any classifications, associations, symbols, links, etc.

The AI NLP/ML system 306 may include a searching component for topic searches and/or queries such that the searching component returns a list of links and/or a structured result based on matching symbols and/or associations between documentation and symbols of the source code.

The AI NLP/ML system 306 may include a navigation component for learning user navigation and/or selection of content in the enriched IDE 314 to improve navigation for the user. In one approach, the navigation component may incorporate analysis of which routes the user navigates through results and/or the code base in order to adjust the relevance of associations and/or classifications. Determining and/or adjusting relevancy may include performing statistical analysis of the prevalence of the symbols in the documentation, the frequency of access to certain documentation, the frequency of modifications made to various portions of the source code, etc. The relevancy of the associations and/or classifications may be used to focus the results to the information that the user is seeking. In one approach, the AI NLP/ML system 306 may track, with the user's permission, how the user interacts with the enriched IDE 314 to help the user find the right documentation and/or efficiently learn the code base.

Figure 4:
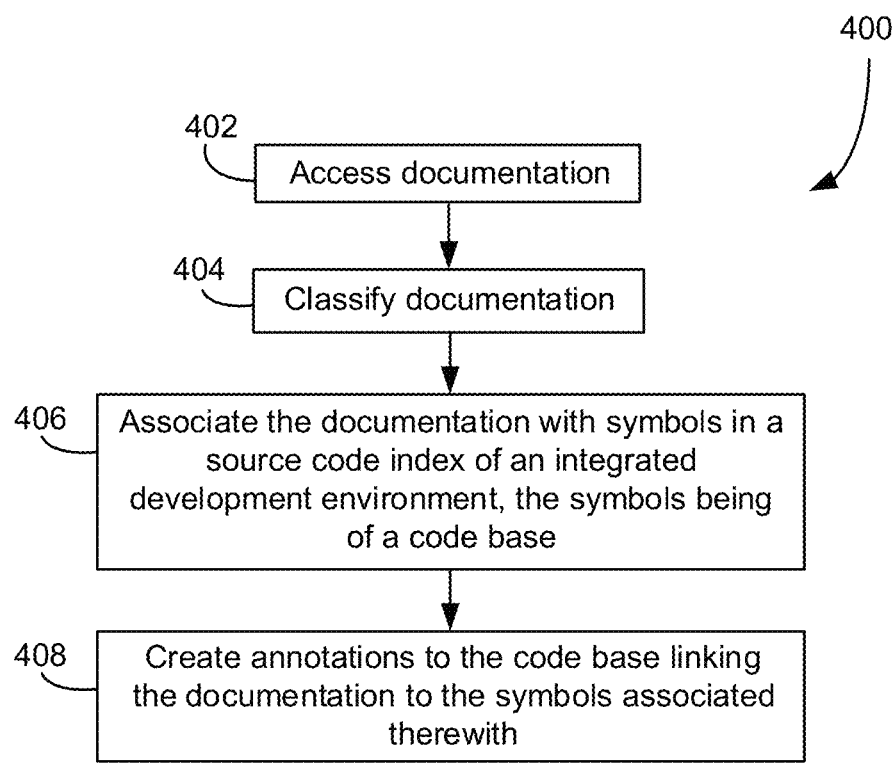
FIG. 4 is a flowchart of a method, according to one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 includes operation 402, where documentation may be accessed. The documentation may comprise source code, design documents, design specifications, emails, user documentation, patents, audiovisual recordings, wikis, word documents, PowerPoint presentations, printable document format (PDF), or any other form of documentation known in the art. In some approaches, the documentation may relate to software development. In a preferred approach, at least some of the documentation comprises source code.

In another approach, multiple forms of documentation may be provided as a corpus and/or group of data sources defined by the user. The documentation may comprise all of the same type and/or form. For example, all of the documentation provided may be in the form of emails corresponding to a particular IP project. The documentation may comprise different types including any of the types and/or forms listed above. The documentation may comprise non-text based documents. In some approaches, the non-text based documentation may be preprocessed via any audio to text processing technique known in the art.

In one approach, a notification may be generated such as, for example, to alert one or more users and/or systems, when the documentation is accessed.

Operation 404 may include classifying the documentation. Classifying documentation may include classifying the documentation into types and/or forms of documentation such as into the types and/or forms described above. Classifications may include information derived from the documentation including objects, functions, declarations, variables, statements, inquiries, requirements, explanations of the source code, explanations of the behavior of the system, problems, solutions, modifications, completed tasks, etc.

In one approach, natural language processing techniques may be used to classify documentation and/or information derived from the documentation. Any natural language processing technique known in the art may be used. In a preferred approach, Watson Natural Language Understanding (International Business Machines (IBM) Corporation, 1 New Orchard Road Armonk, N.Y. 10504-1722, United States) may be used to perform the natural language processing.

In a preferred approach, operation 404 may include generating a knowledge base comprising the classifications of the documentation and/or information derived from the documentation. In one approach, when natural language processing is performed on documentation, the content of the documentation may be searched against the knowledge base (e.g., a database or other data storage method of the consumed content with classifications and/or associations of the documentation to determine similarities in existing documentation).

Operation 406 includes associating the documentation with symbols in a source code index of an integrated development environment, the symbols being of a code base. In one approach, cognitive associations determined by various AI systems and/or techniques may be made in the content of the documentation resulting in a mapping between the documentation and symbols in the source code index. In another approach, associations may include more complex associations based on a combination of symbols of the source code index. In some approaches, the content of the documentation may include a relevancy score associated with the symbol of the source code index. In one approach, a relevancy score may be determined by statistical analysis of the frequency of the symbol of the source code index within the content of the documentation.

In one approach, the knowledge base may be used to associate the documentation with symbols in a source code index of an integrated development environment, the symbols being of a code base.

In another approach, associating the documentation with symbols in a source code index of an integrated development environment may comprise generating a semantic graph of terms in the documentation. In one approach, a semantic graph may be a visual representation of the terms in the documentation and any semantic relationships between terms. The processed language may be used to generate a semantic graph using any technique known in the art. Natural language processing and/or machine learning systems may be used to process text in the form of human language. Semantic graphs may provide a structure for analyzing information derived from the documentation.

Operation 406 may comprise generating a class hierarchy graph of the code base. A class hierarchy graph may be of any type known in the art. Any existing IDE may be used generate a class hierarchy graph.

Operation 406 may comprise associating terms from the documentation with terms in a class hierarchy graph of a source code. Any known analysis software may be used to associate terms from the documentation with terms in a class hierarchy graph. In a preferred approach, Watson's semantic analysis capabilities and NLP may be used to associate terms from the documentation with terms in the class hierarchy graph. In some approaches, the cognitive associations determined by AI and/or NLP techniques may include complex associations based on any combination of two or more concepts derived from the documentation and/or the class hierarchy graph.

Cognitive associations between the documentation and the class hierarchy graph as determined by AI and/or NLP techniques may be stored in the knowledge base.

In one approach, associating symbols of the source code index with the documentation may provide a correlation between locations in the documentation and the current code base. For example, functions in the code may be associated with explanatory comments in the documentation.

Operation 408 comprises creating annotations to the code base linking the documentation to the symbols associated therewith. In some approaches, the annotations to the code base are integrated into an existing IDE (e.g., an enriched IDE). The enriched IDE may comprise the code base with integration of corresponding documentation. For example, the enriched IDE may comprise a code base in which a user may be able to easily access relevant portions of the documentation without exiting the enriched IDE.

In one approach, the annotations may be displayed in a topic hierarchy with links to various documentation. In another approach, the annotations may be viewed as a list of relevant documentation with topics and subtopics, providing links between documentation when there is an overlap. The annotations may also be available via a searchable knowledge base.

In one approach, the enriched IDE is capable of source code analysis as an IDE is conventionally capable of. The enriched IDE may comprise various AI, NLP, and/ML capabilities for documentation classification and/or analysis. In a preferred approach, the user may make changes to the code base which are integrated into the linked and/or integrated corresponding documentation.

In a preferred approach, the enriched IDE provides users with efficient access to all documentation relating to development within the source code. For example, in conventional development situations, variable declarations specify an object's type and location. In one approach, the enriched IDE may provide a larger context for the object the via the integrated documentation. A developer may view the decisions which preceded the existence of the variables using the enriched IDE. Viewing these decisions may prevent regressions which occur when refactoring the code base invalidates the design.

For example, a variable may be renamed in a code base. Traditional IDE refactoring of the code base may reflect the new name in all the instances in the code base. However, traditional refactoring of the code base may not affect external documentation. In one approach, the enriched IDE may integrate the new name for the variable into any documentation.

In another example, a developer may look at a function within the source code and various embodiments as described herein may provide a unified view between the knowledge base and the relevant section of the code. In some approaches, the unified view may be exemplified by a twisty just above a function declaration, a hover-over on the function name, or any other implementation into a GUI known in the art. In these approaches, the IDE provides the benefit of populating relevant portions of the documentation on the same screen as the code base versus directing a developer to an external page. In one approach, the enriched IDE may display additional links to documentation that is relevant to the function. In another approach, the documentation may be viewable as a portable document format (PDF) inside the enriched IDE.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
accessing, by a computer, documentation;
classifying, by the computer, the documentation;
associating, by the computer, the documentation with symbols in a source code index of an integrated development environment, the symbols being of a code base;
creating, by the computer, annotations to the code base linking the documentation to the symbols associated therewith;
integrating, by the computer, changes in the code base into the associated documentation, wherein integrating the changes in the code base includes modifying the associated documentation,
wherein the associated documentation is external to the integrated development environment,
wherein the associated documentation includes at least two types of documentation selected from the group consisting of: source code, text-based documentation, and non-text based documentation; and
allowing, by the computer, a user to access relevant portions of the associated documentation without exiting the integrated development environment.

2. The computer-implemented method of claim 1, wherein modifying the associated documentation includes reflecting annotations to the code base in the associated documentation, wherein the associated documentation is external to the code base, wherein reflecting the annotations to the code base in the associated documentation is not performed by the user.

3. The computer-implemented method of claim 1, comprising generating, by the computer, a knowledge base for storing the documentation, classifications of the documentation, and associations of the documentation with symbols in the source code index of the integrated development environment, wherein the knowledge base functions at least in part as a search engine for an artificial intelligence natural language processing/machine learning (AI NLP/ML) system.

4. The computer-implemented method of claim 3, wherein associating the documentation with symbols in the source code index of the integrated development environment includes searching the documentation against the knowledge base.

5. The computer-implemented method of claim 1, comprising generating, by the computer, a semantic graph of terms in the documentation.

6. The computer-implemented method of claim 1, comprising generating, by the computer, a class hierarchy graph of the code base.

7. The computer-implemented method of claim 1, wherein the documentation is associated with symbols in the source code index of the integrated development environment based on relevancy of documentation to the symbols in the source code index of the integrated development environment as determined by statistical analysis of the documentation, wherein the relevancy of the documentation to the symbols in the source code index of the integrated development environment is based on at least one factor selected from the group consisting of: prevalence of the symbols in the documentation, frequency of access to certain documentation, and frequency of modifications made to certain portions of the source code.

8. A computer program product for an enriched integrated development environment, the computer program product comprising a computer readable storage medium having program instructions embodied therewith, the program instructions executable by a computer to cause the computer to:
  access, by the computer, documentation;
  classify, by the computer, the documentation;
  associate, by the computer, the documentation with symbols in a source code index of an integrated development environment, the symbols being of a code base;
  create, by the computer, annotations to the code base linking the documentation to the symbols associated therewith;
  integrate, by the computer, changes in the code base into the associated documentation, wherein integrating the changes in the code base includes modifying the associated documentation,
  wherein the associated documentation is external to the integrated development environment,
  wherein the associated documentation includes at least two types of documentation selected from the group consisting of: source code, text-based documentation, and non-text based documentation; and
  allow, by the computer, a user to access relevant portions of the associated documentation without exiting the integrated development environment.

9. The computer program product of claim 8, wherein modifying the associated documentation includes reflecting annotations to the code base in the associated documentation, wherein the associated documentation is external to the code base, wherein reflecting the annotations to the code base in the associated documentation is not performed by the user.

10. The computer program product of claim 8, comprising program instructions to cause the computer to:
  generate, by the computer, a knowledge base for storing the documentation, classifications of the documentation, and associations of the documentation with symbols in the source code index of the integrated development environment,
    wherein the knowledge base functions at least in part as a search engine for an artificial intelligence natural language processing/machine learning (AI NLP/ML) system.

11. The computer program product of claim 10, wherein associating the documentation with symbols in the source code index of the integrated development environment includes searching the documentation against the knowledge base.

12. The computer program product of claim 8, comprising program instructions to cause the computer to:
  generate, by the computer, a semantic graph of terms in the documentation.

13. The computer program product of claim 8, comprising program instructions to cause the computer to:
  generate, by the computer, a class hierarchy graph of the code base.

14. The computer program product of claim 8, wherein the documentation is associated with symbols in the source code index of the integrated development environment based on relevancy of documentation to the symbols in the source code index of the integrated development environment as determined by statistical analysis of the documentation, wherein the relevancy of the documentation to the symbols in the source code index of the integrated development environment is based on at least one factor selected from the group consisting of: prevalence of the symbols in the documentation, frequency of access to certain documentation, and frequency of modifications made to certain portions of the source code.

15. A system, comprising:
  a processor; and
  logic integrated with the processor, executable by the processor, or integrated with and executable by the processor, the logic being configured to:
  access documentation;
  classify the documentation;
  associate the documentation with symbols in a source code index of an integrated development environment, the symbols being of a code base;
  create annotations to the code base linking the documentation to the symbols associated therewith;
  integrate changes in the code base into the associated documentation, wherein integrating the changes in the code base includes modifying the associated documentation wherein the associated documentation is external to the integrated development environment,
  wherein the associated documentation includes at least two types of documentation selected from the group consisting of: source code, text-based documentation, and non-text based documentation; and
  allow a user to access relevant portions of the associated documentation without exiting the integrated development environment.

16. The system of claim 15, wherein modifying the associated documentation includes reflecting annotations to the code base in the associated documentation, wherein the associated documentation is external to the code base, wherein reflecting the annotations to the code base in the associated documentation is not performed by the user.

17. The system of claim 15, comprising logic configured to generate a knowledge base for storing the documentation, classifications of the documentation, and associations of the documentation with symbols in the source code index of the integrated development environment, wherein the knowledge base functions at least in part as a search engine for an artificial intelligence natural language processing/machine learning (AI NLP/ML) system.

18. The system of claim 17, wherein associating the documentation with symbols in the source code index of the integrated development environment includes searching the documentation against the knowledge base.

19. The system of claim 15, comprising logic configured to generate a semantic graph of terms in the documentation.

20. The system of claim 15, comprising logic configured to generate a class hierarchy graph of the code base.

* * * * *